(12) United States Patent
Cheng et al.

(10) Patent No.: US 12,047,929 B2
(45) Date of Patent: Jul. 23, 2024

(54) TECHNIQUES FOR BEAM MANAGEMENT IN WIRELESS COMMUNICATIONS

(71) Applicant: QUALCOMM Incorporated, San Diego, CA (US)

(72) Inventors: Peng Cheng, Beijing (CN); Masato Kitazoe, Hachiouji (JP); Tao Luo, San Diego, CA (US); Keiichi Kubota, Tokyo (JP); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 16/643,414

(22) PCT Filed: Sep. 13, 2018

(86) PCT No.: PCT/CN2018/105478
§ 371 (c)(1),
(2) Date: Feb. 28, 2020

(87) PCT Pub. No.: WO2019/062552
PCT Pub. Date: Apr. 4, 2019

(65) Prior Publication Data
US 2020/0367223 A1      Nov. 19, 2020

(30) Foreign Application Priority Data

Sep. 29, 2017    (WO) ................ PCT/CN2017/104257

(51) Int. Cl.
*H04W 4/00*      (2018.01)
*H04W 72/044*    (2023.01)
*H04W 72/541*    (2023.01)

(52) U.S. Cl.
CPC ....... *H04W 72/046* (2013.01); *H04W 72/541* (2023.01)

(58) Field of Classification Search
CPC ............ H04W 72/046; H04W 72/082; H04W 72/541; H04W 24/10; H04W 16/28;
(Continued)

(56) References Cited

U.S. PATENT DOCUMENTS 9,414,285 B2    8/2016    Hampel et al.
9,832,629 B2    11/2017   Chen et al.
(Continued)

FOREIGN PATENT DOCUMENTS

CN    105007126 A    10/2015
CN    105322992 A    2/2016
(Continued)

OTHER PUBLICATIONS

Ericsson, "Triggering Condition for A1-A6 Events in NR," 3GPP TSG-RAN WG2 Meeting #99, R2-1709492, Aug. 12, 2017, 3 pages.
(Continued)

*Primary Examiner* — Thai D Hoang
(74) *Attorney, Agent, or Firm* — Arent Fox, LLP

(57) ABSTRACT

Aspects of the present disclosure describe managing beams in wireless communications. A beam management event configuration indicating a type of at least one beam to measure in determining occurrence of a trigger condition for a beam management event can be received. A parameter of a signal received from one or more nodes can be measured, where the signal corresponds to the type of the at least one beam. The occurrence of the trigger condition for the beam management event can be determined based on the parameter of the signal. An indication of the occurrence of the trigger condition can be reported to the one or more nodes or a different node.

47 Claims, 7 Drawing Sheets

(58) Field of Classification Search
CPC ... H04L 5/0023; H04L 5/0051; H04L 5/0053; H04B 7/0617; H04B 17/336; H04B 17/382; H04B 17/318; H04B 7/061; H04B 7/0639

USPC .................................. 370/329–330, 335–345

See application file for complete search history.

(56) References Cited

U.S. PATENT DOCUMENTS

| | | | |
|---|---|---|---|
| 2013/0301455 A1 | 11/2013 | Jung | |
| 2016/0150435 A1* | 5/2016 | Baek | H04W 24/10 370/252 |
| 2016/0337874 A1 | 11/2016 | Yang et al. | |
| 2017/0047976 A1 | 2/2017 | Noh et al. | |
| 2017/0207843 A1* | 7/2017 | Jung | H04B 7/0695 |
| 2017/0214444 A1 | 7/2017 | Nigam et al. | |
| 2018/0270689 A1* | 9/2018 | Akkarakaran | H04B 7/0639 |
| 2018/0368009 A1* | 12/2018 | Xia | H04B 7/0695 |
| 2019/0075573 A1* | 3/2019 | Kwon | H04W 72/046 |
| 2019/0174346 A1* | 6/2019 | Murray | H04W 72/046 |
| 2019/0223043 A1* | 7/2019 | Geng | H04L 5/0051 |
| 2020/0014453 A1* | 1/2020 | Takeda | H04W 56/001 |
| 2020/0178130 A1* | 6/2020 | Pakniat | H04L 5/0048 |
| 2021/0211181 A1* | 7/2021 | Yang | H04W 80/02 |
| 2021/0243630 A1* | 8/2021 | Bai | H04B 17/318 |
| 2021/0345191 A1* | 11/2021 | Da Silva | H04W 36/0058 |
| 2021/0399785 A1* | 12/2021 | Sakhnini | H04W 72/02 |
| 2021/0409097 A1* | 12/2021 | Zhang | H04B 17/336 |

FOREIGN PATENT DOCUMENTS

| | | | |
|---|---|---|---|
| CN | 106341873 A | 1/2017 | |
| CN | 107135025 A | 9/2017 | |
| EP | 3648501 A1 | 5/2020 | |
| EP | 3509340 B1 | 7/2020 | |
| EP | 3958609 A1 | 2/2022 | |
| WO | 2015116342 A1 | 8/2015 | |
| WO | 2016003624 A1 | 1/2016 | |
| WO | WO-2019030731 A1 * | 2/2019 | |
| WO | WO-2019032853 A1 * | 2/2019 | H04B 7/0408 |

OTHER PUBLICATIONS

Ericsson, "Triggering Condition for A1-A6 Events in NR," 3GPP TSG-RAN WG2 Meeting #99-bis on NR, R2-1710846, Sep. 28, 2017, 4 pages.

International Search Report and Written Opinion—PCT/CN2017/104257—ISA/EPO—dated Jun. 26, 2018.

International Search Report and Written Opinion—PCT/CN2018/105478—ISA/EPO—Dec. 5, 2018.

Taiwan Search Report—TW107134061—TIPO—dated Dec. 22, 2021.

Catt., et al., "Further Considerations on Events C1 and C2[online]", 3GPP TSG RAN WG2 #99, R2-1707900, Aug. 11, 2017, pp. 1-5.

Ericsson: "Summary of Email Discussion [99#32][NR] TP on RRM[online]",3GPP TSG RAN WG2 #99bis R2-1710839, Sep. 28, 2017, pp. 1-28.

National Instruments: "On Remaining Aspects of Beam Recovery [online]", 3GPP TSG RAN WG1 #90, R1-1714180, Aug. 12, 2017, pp. 1-10.

Nokia., et al., "Reference Signals and Measurements for Beam Management and Mobility", R1-1708904, 3GPP TSG RAN WG1#89, Hangzhou, P.R. China May 15-19, 2017, 6 Pages.

Mediatek Inc., "RRM Measurement in Connected Based on NR-SS and CSI-RS", 3GPP TSG-RAN WG2 Meeting 97bis, R2-1702771, Spokane, USA, Apr. 3-7, 2017, 4 Pages.

QUALCOMM: "Beam Management for NR", 3GPP Draft; 3GPP TSG-RAN1 #88bis, R1-1705581, Beam Management for NR, 3rd Generation-Partnership Project (3GPP), Mobile Competence Centre, 650, Route Des Lucioles, F-06921 Sophia-Antipolis Cedex, France, vol. RAN WG1, No. Spokane, USA; Apr. 3, 2017-Apr. 7, 2017, Apr. 2, 2017 (Apr. 2, 2017), XP051243709, 7 pages, Retrieved from the Internet: URL: http://www.3gpp.org/ftp/Meetings_3GPP_SYNC/RAN1/Docs/ [retrieved on Apr. 2, 2017] the whole document.

Samsung: "Remaining Issues of NR RRM Measurement Configuration", 3GPP Draft, 3GPP TSG-RAN WG2 2017 RAN2#99 Meeting, R2-1709685, Remaining Issues of NR RRM Measurement Configuration, 3rd Generation Partnership Project (3GPP), Mobile Competence Centre; 650, Route Des Lucioles; F-06921, Sophia-Antipolis Cedex; France, vol. RAN WG2, No. Berlin, Germany; Aug. 21, 2017-Aug. 25, 2017, Aug. 20, 2017 (Aug. 20, 2017), XP051319389, 5 pages, Sections 2.1 and 2.3.

Sony: "RRM Measurements Open Issues", 3GPP Draft, 3GPP TSG RAN WG2 Meeting #98, R2-1704832, NR RRM Measurements, 3rd Generation Partnership Project (3GPP), Mobile Competence Centre; 650, Route Des Lucioles; F-06921, Sophia-Antipolis Cedex; France, vol. RAN WG2, No. Hangzhou, China; May 15, 2017-May 19, 2017, May 14, 2017 (May 14, 2017), XP051275349, 7 pages, Retrieved from the Internet: URL: http://www.3gpp.org/ftp/Meetings_3GPP_SYNC/RAN2/Docs/ [retrieved on May 14, 2017], p. 1, p. 6, figures 1,3.

Supplementary European Search Report—EP18860674—Search Authority—The Hague—dated May 18, 2021.

* cited by examiner

TECHNIQUES FOR BEAM MANAGEMENT IN WIRELESS COMMUNICATIONS

CLAIM OF PRIORITY

The present application is a National Phase of International Patent Application No. PCT/CN2018/105478, filed on Sep. 13, 2018, which claims priority to International Patent Application No. PCT/CN2017/104257 entitled "TECHNIQUES FOR BEAM MANAGEMENT IN WIRELESS COMMUNICATIONS" filed Sep. 29, 2017, which are assigned to the assignee hereof and hereby expressly incorporated by reference herein.

BACKGROUND

Aspects of the present disclosure relate generally to wireless communication systems, and more particularly, to managing beam transmission.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

The network can configure user equipment (UE) with channel state information reference signals (CSI-RS) for use in estimating a channel and/or reporting channel quality to the network. Currently, in 5G NR, the network can transmit multiple CSI-RS sets using different beams to provide UEs with desirable beamforming. In this regard, the network configures all possible CSI-RS resources for a UE and activates one for a given UE based on layer 1 reporting from the UE regarding the corresponding CSI-RSs (e.g., the one having the most desirable signal strength and/or quality). Having the UE receive and measure all CSI-RS for each configuration may cause undue overhead on the UE. In addition, in some configurations, 5G NR can allow for multiple transmission/reception points (TRxP) for a given gNB, each of which can transmit multiple CSI-RS at different beamforming configurations, which can further cause overhead at the UE receiving and reporting quality metrics for the various CSI-RSs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for managing beams in wireless communications is provided. The method includes receiving a beam management event configuration indicating a type of at least one beam to measure in determining occurrence of a trigger condition for a beam management event, measuring a parameter of a signal received from one or more nodes, where the signal corresponds to the type of the at least one beam, determining, based on the parameter of the signal, the occurrence of the trigger condition for the beam management event, and reporting, to the one or more nodes or a different node, an indication of the occurrence of the trigger condition.

In another example, a method for managing beams in wireless communications is provided. The method includes generating a beam management event configuration indicating a type of at least one beam to measure in determining occurrence of a trigger condition for a beam management event, transmitting the beam management event configuration to one or more nodes, receiving, from the one or more nodes, an indication of the trigger condition, generating, for the one or more nodes and based on receiving the indication of the trigger condition, a beam configuration for utilizing one or more transmitted beams in estimating a transmitted channel, and transmitting the beam configuration to the one or more nodes.

In another example, an apparatus for managing beams in wireless communications is provided. The apparatus includes a transceiver for communicating one or more wireless signals via one or more antennas, a memory configured to store instructions, and one or more processors communicatively coupled with the transceiver and the memory. The one or more processors are configured to receive a beam management event configuration indicating a type of at least one beam to measure in determining occurrence of a trigger condition for a beam management event, measure a parameter of a signal received from one or more nodes, where the signal corresponds to the type of the at least one beam, determine, based on the parameter of the signal, the occurrence of the trigger condition for the beam management event, and report, to the one or more nodes or a different node, an indication of the occurrence of the trigger condition.

In another example, an apparatus for managing beams in wireless communications is provided. The apparatus includes a transceiver for communicating one or more wireless signals via one or more antennas, a memory configured to store instructions, and one or more processors communicatively coupled with the transceiver and the memory. The one or more processors are configured to generate a beam management event configuration indicating a type of at least one beam to measure in determining occurrence of a trigger condition for a beam management event, transmit the beam management event configuration to one or more nodes, receive, from the one or more nodes, an indication of the trigger condition, generate, for the one or more nodes and based on receiving the indication of the trigger condition, a beam configuration for utilizing one or more transmitted beams in estimating a transmitted channel, and transmit the beam configuration to the one or more nodes.

In another example, an apparatus for managing beams in wireless communications is provided. The apparatus includes means for receiving a beam management event configuration indicating a type of at least one beam to measure in determining occurrence of a trigger condition for a beam management event, means for measuring a parameter of a signal received from one or more nodes, wherein the signal corresponds to the type of the at least one beam, means for determining, based on the parameter of the signal, the occurrence of the trigger condition for the beam management event, and means for reporting, to the one or more nodes or a different node, an indication of the occurrence of the trigger condition.

In a further aspect, an apparatus for managing beams in wireless communications is provided. The apparatus includes means for generating a beam management event configuration indicating a type of at least one beam to measure in determining occurrence of a trigger condition for a beam management event, means for transmitting the beam management event configuration to one or more nodes, means for receiving, from the one or more nodes, an indication of the trigger condition, means for generating, for the one or more nodes and based on receiving the indication of the trigger condition, a beam configuration for utilizing one or more transmitted beams in estimating a transmitted channel, and means for transmitting the beam configuration to the one or more nodes.

In a further aspect, a computer-readable storage medium, including computer-executable code for managing beams in wireless communications is provided. The code includes code for receiving a beam management event configuration indicating a type of at least one beam to measure in determining occurrence of a trigger condition for a beam management event, measuring a parameter of a signal received from one or more nodes, wherein the signal corresponds to the type of the at least one beam, determining, based on the parameter of the signal, the occurrence of the trigger condition for the beam management event, and reporting, to the one or more nodes or a different node, an indication of the occurrence of the trigger condition.

In another aspect, a computer-readable storage medium, including computer-executable code for managing beams in wireless communications is provided. The code includes code for generating a beam management event configuration indicating a type of at least one beam to measure in determining occurrence of a trigger condition for a beam management event, transmitting the beam management event configuration to one or more nodes, receiving, from the one or more nodes, an indication of the trigger condition, generating, for the one or more nodes and based on receiving the indication of the trigger condition, a beam configuration for utilizing one or more transmitted beams in estimating a transmitted channel, and transmitting the beam configuration to the one or more nodes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
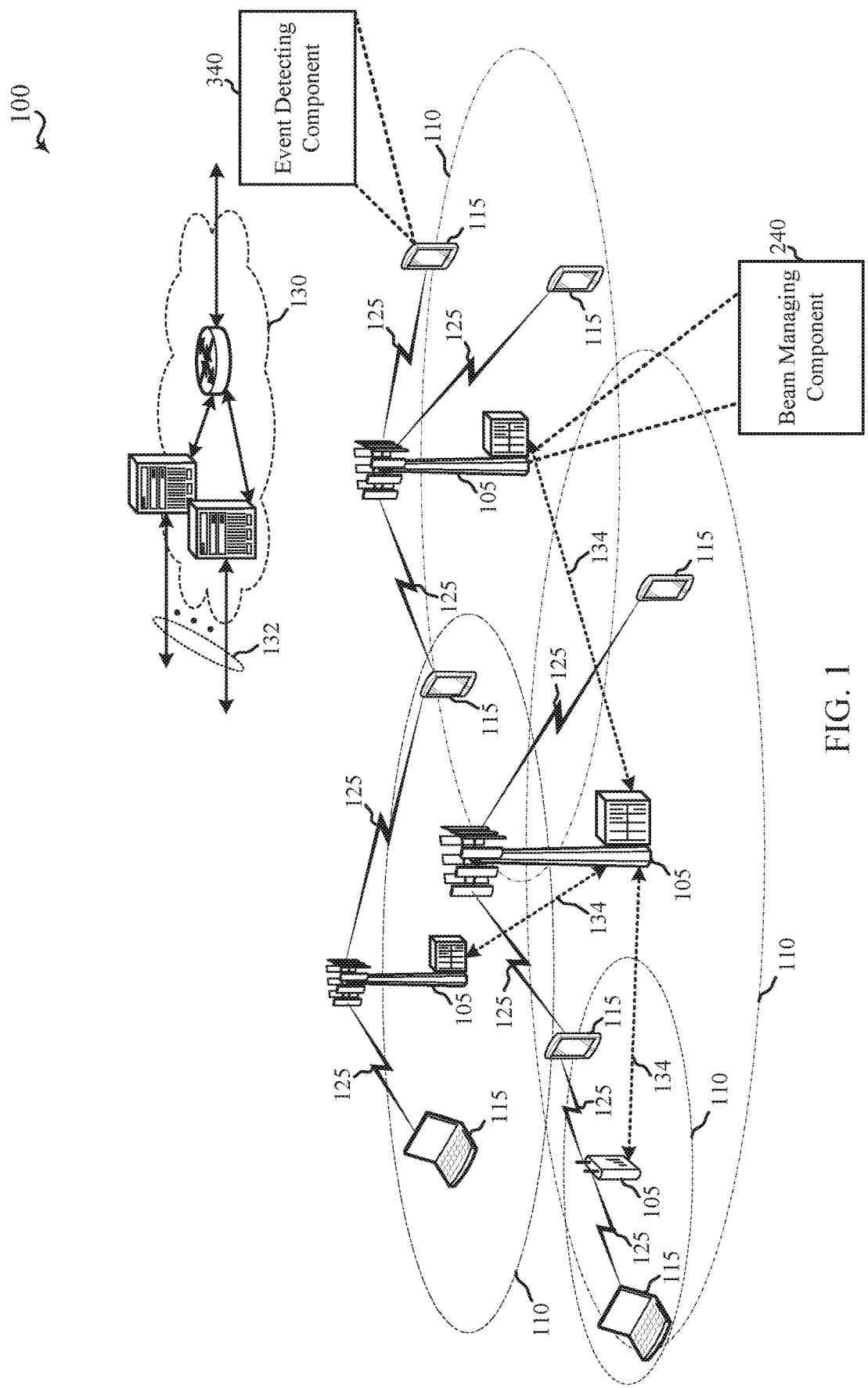
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring beam management in wireless communications based at least in part on configuring beam management events to cause reporting of one or more conditions by one or more nodes in a network. Reporting the one or more conditions may result in reconfiguring beams (e.g., reference signals (RS), synchronization signals (SS), other broadcast signals/beams, etc.) for the one or more nodes. For example, the network can configure beam management events corresponding to certain types of beams, certain instances of beams identified by an identifier, certain groups of beams associated with a group identifier, etc., and the one or more nodes can accordingly measure beam signals that are beamformed by the network to determine whether the beam management events have occurred. The one or more nodes can report the beam management events to the network (e.g., where one or more beam management events have occurred). In one example, the network can accordingly determine a beam configuration for the one or more nodes based on occurrence of the beam management events and/or related parameters (e.g., signal measurements of the beams).

In specific examples, the network (e.g., via a gNB or other network node) can transmit beamformed signals, which may include one or more types of beams, such as a channel state information reference signal (CSI-RS), one or more synchronization signals, such as a new radio synchronization signal (NR-SS), other broadcast signals, etc. The network can configure beam management events at least by communicating a configuration to one or more network nodes, where the configuration may indicate an identifier of one or more beamformed signals to measure (e.g., one or more CSI-RS identifiers, NR-SS identifiers, group identifiers that are mapped to one or more CSI-RSs or NR-SSs, etc.). The one or more nodes can accordingly measure the configured RSs as transmitted by the network based on determining signals having the associated identifiers. The one or more nodes may measure a signal strength, signal quality, signal-to-interference-and-noise ratio (SINR), etc. In an example, the metrics to measure may also be indicated in the beam management event configuration. The beam management event configuration may also indicate a time to trigger indicating a period of time during which the beam management event occurs before reporting an indication of the event. The time to trigger may be specified for each metric in the configuration, each specified beam type in the configuration, etc. In any case, for example, the one or more nodes can report an indication of occurrence of the specified beam management event(s) to the network (e.g., after the associated time to trigger), and/or the network may accordingly modify a beam configuration (e.g., specifically a CSI-RS configuration, or a more general beam configuration that includes other types of beams) based on metrics indicated in the beam management event(s).

In an example, beam management and/or mobility without radio resource control (RRC) involvement can be performed in fifth generation (5G) new radio (NR) networks. Beam management can generally refer to a set of layer 1 (L1)/layer 2 (L2) procedures to acquire and maintain a set of transmission/reception points (TRxP(s)) and/or UE beams that can be used for downlink (DL) and/or uplink (UL) transmission/reception, which can include one or more of the following aspects: beam determination (e.g., for TRxP(s) or UE to select of its own Tx/Rx beams); beam measurement (e.g., for TRxP(s) or UE to measure characteristics of received beamformed signals); and/or beam reporting (e.g., for UE to report information of beamformed signal(s) based on beam measurement). RRC/radio resource management (RRM) may not be required to know which beam is actually being used for transmission at a certain time, and the "beam switch procedure" in "zero/minimum RRC involvement" can be transparent to RRC/RRM. NR-SS and/or CSI-RS can be used for beam management, as described further herein. In these examples, the UE can transmit measurements of NR-SS and/or CSI-RS to the network based on the received configuration.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A media access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In aspects of the wireless communication system 100, one or more of the base stations 105 may include a beam managing component 240 for configuring one or more UEs with a beam management event configuration for detecting and reporting occurrence of one or more beam management events to the base station 105. Based on this report, in an example, the base station 105 may modify a beam configuration for the one or more UEs 115. In additional aspects, UE 115 may include an event detecting component 340 for detecting one or more beam management events defined in the configuration, which may correspond to detecting beam measurement values with respect to one or more thresholds defined in the configuration.

Figure 2:
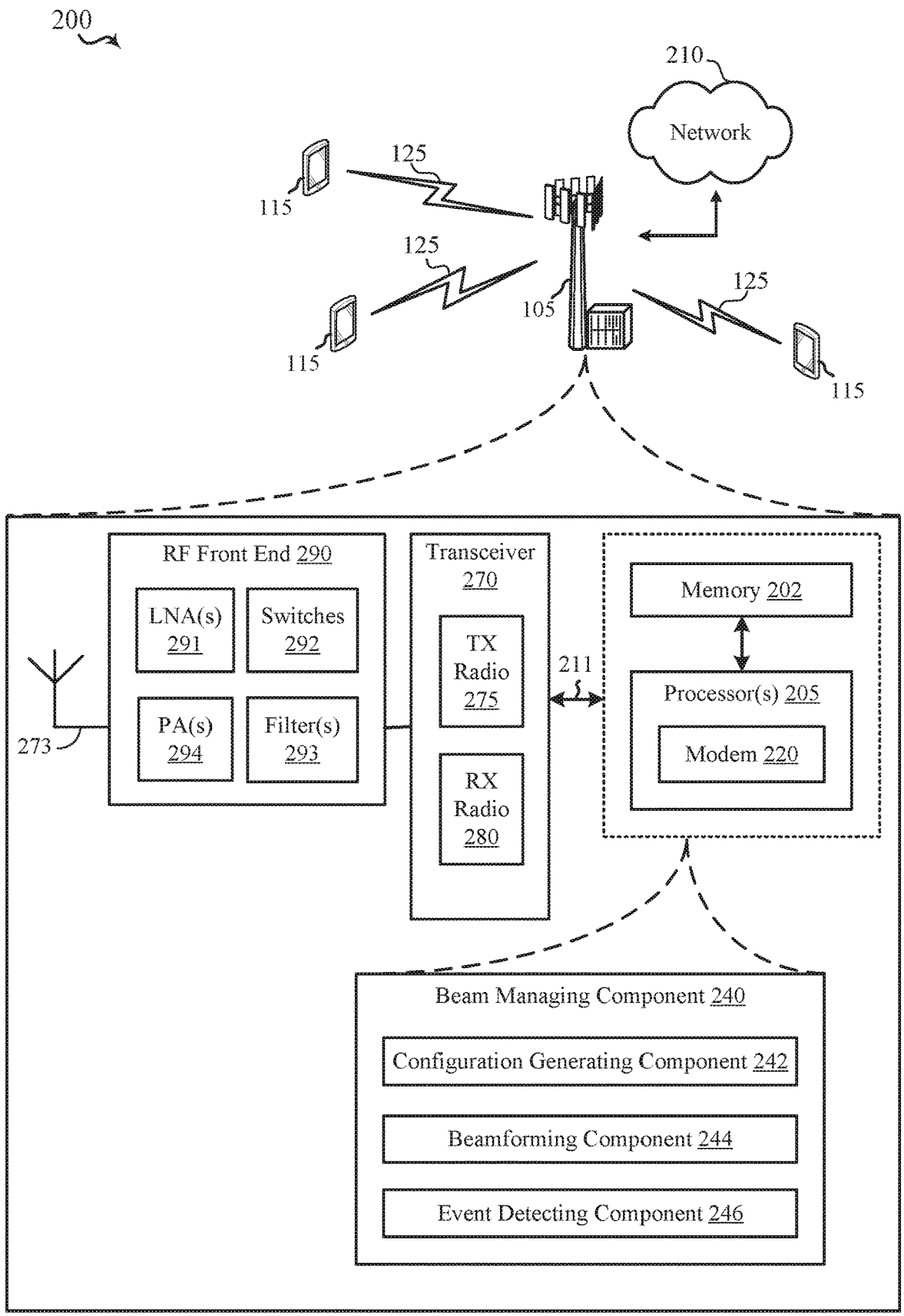
FIG. 2 is a block diagram illustrating an example of a base station, in accordance with various aspects of the present disclosure.
Figure 3:
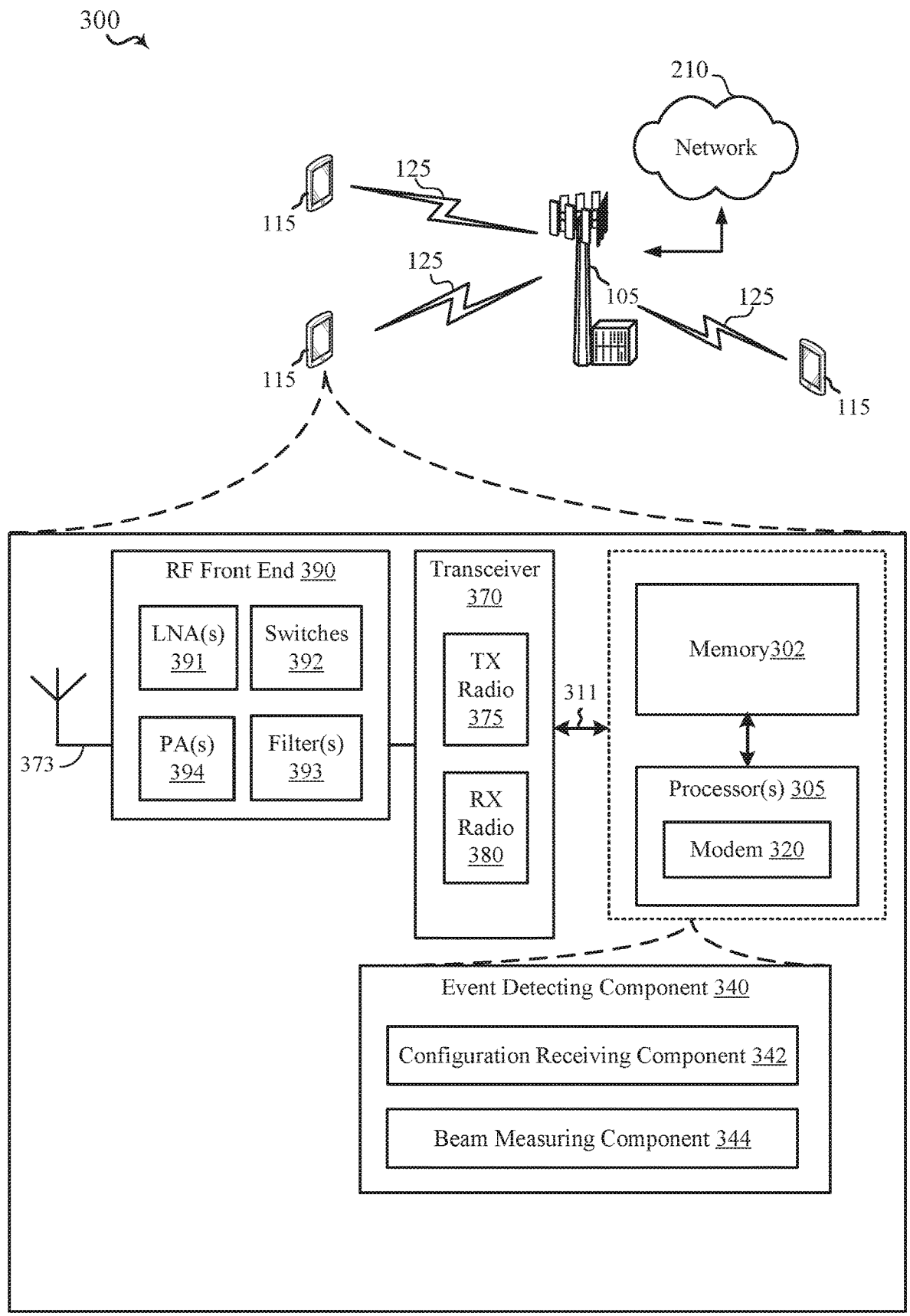
FIG. 3 is a block diagram illustrating an example of a UE, in accordance with various aspects of the present disclosure.
Figure 4:
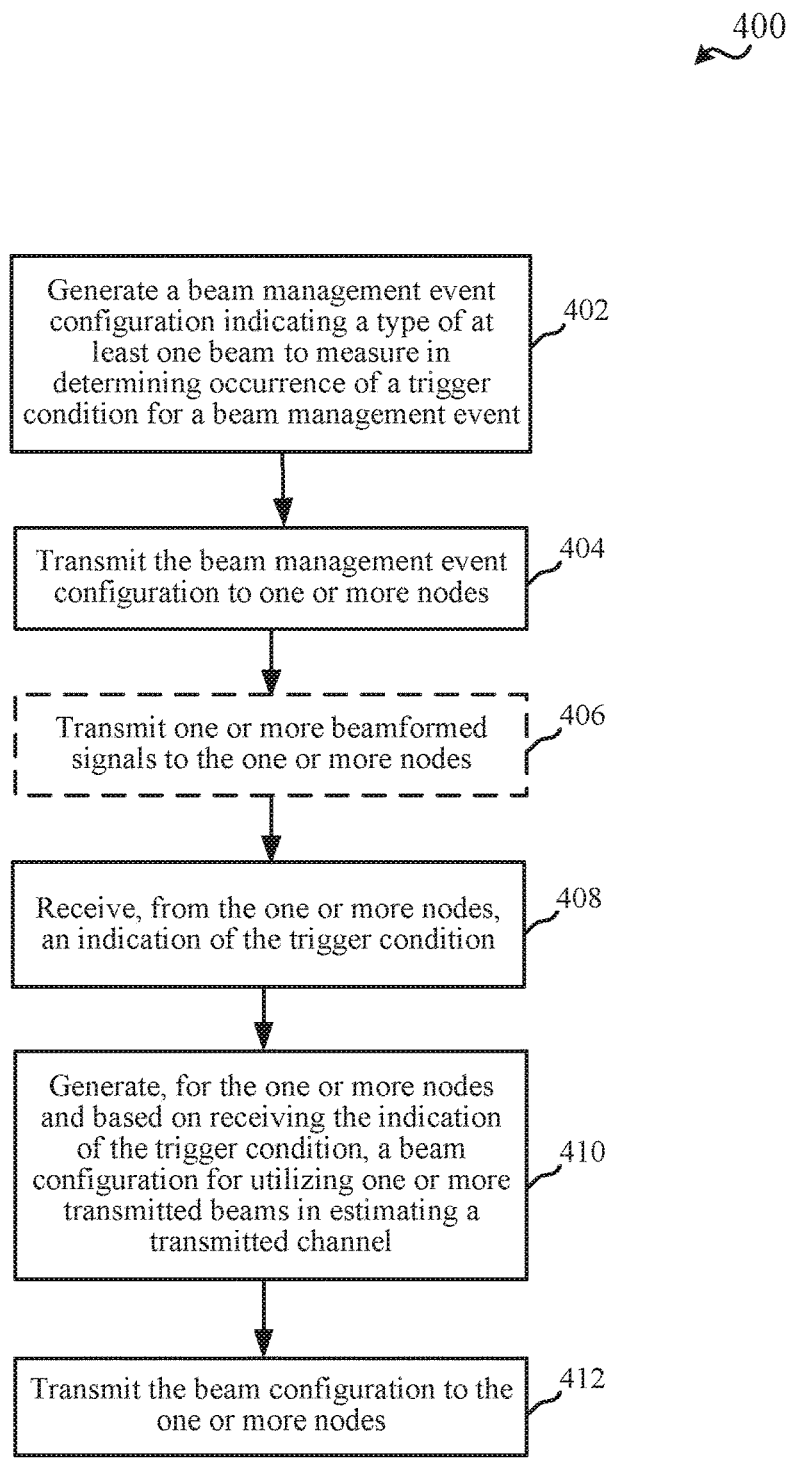
FIG. 4 is a flow chart illustrating an example of a method for generating a beam management event configuration, in accordance with various aspects of the present disclosure.
Figure 5:
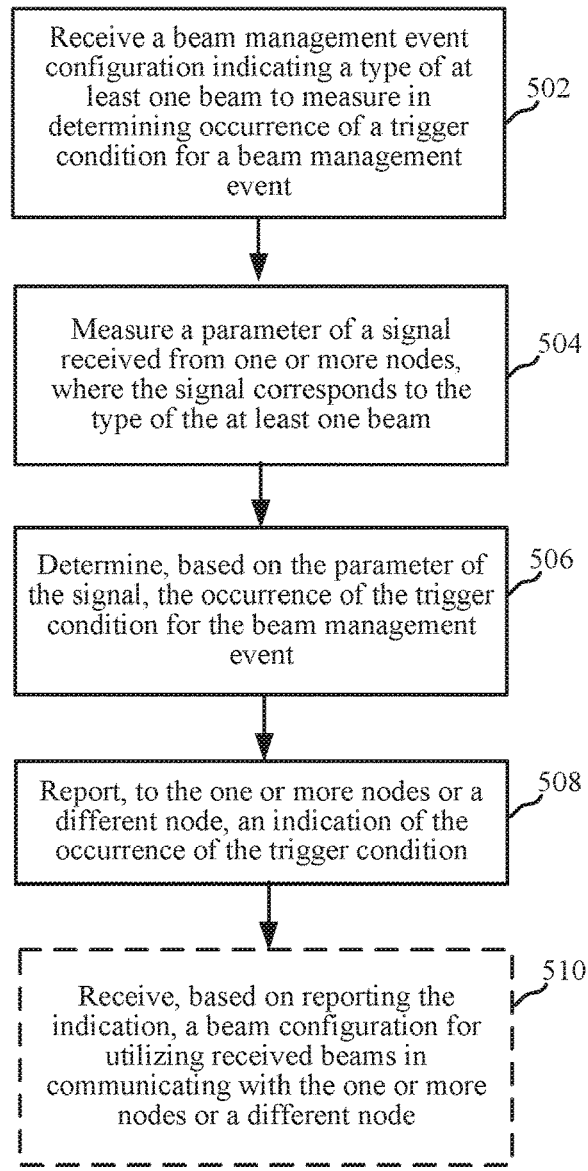
FIG. 5 is a flow chart illustrating an example of a method for detecting beam management events, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, a block diagram 200 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to detect beam management events for reporting to one or more base stations 105. Moreover the base station 105 may be an example of the base stations described in the present disclosure (e.g., eNB, gNB, etc. providing one or more macrocells, small cells, etc.) that are configured to configure beam management event reporting at the UE(s) 115.

In an aspect, the base station in FIG. 2 may include one or more processors 205 and/or memory 202 that may operate in combination with a beam managing component 240 to perform the functions, methods (e.g., method 400 of FIG. 4), etc. presented in the present disclosure. In accordance with the present disclosure, the beam managing component 240 may include a configuration generating component 242 for generating a beam management event configuration indicating one or more parameters related to measuring transmitted beams (e.g., transmitted as reference signals, synchronization signals, and/or other broadcast signals/beams according to a beamforming configuration) to detect one or more events for reporting to the base station 105, a beamforming component 244 for generating beamformed signals for transmitting to one or more UEs 115 (e.g., which may be based on beam management events detected at the UE(s) 115), and/or an event detecting component 246 for detecting occurrence of a beam management event (e.g., at the UE(s) 115) and/or accordingly modifying a beam configuration for the UE(s) 115.

The one or more processors 205 may include a modem 220 that uses one or more modem processors. The various functions related to the beam managing component 240, and/or its sub-components, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the beam managing component 240. In another example, beam managing component 240 may operate at one or more communication layers, such as a physical layer (e.g., layer 1 (L1)), media access control (MAC) layer (e.g., layer 2 (L2)), PDCP layer or RLC layer (e.g., layer 3 (L3)), etc., to configure parameters for beam management event detection.

In some examples, the beam managing component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to receive signals for, or transmit signals generated by, the beam managing component 240 to the UEs. RF front end 290 may be connected to one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels, transmitting and receiving signals, etc. In an aspect, the components of the RF front end 290 can connect with transceiver 270. The transceiver 270 may connect to one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or beam managing component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining beam managing component 240 and/or one or more of its sub-components. Additionally or alternatively, the base station 105 may include a bus 211 for coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 7. Similarly, the memory 202 may correspond to the memory described in connection with the base station in FIG. 7.

Referring to FIG. 3, a block diagram 300 is shown that includes a portion of a wireless communications system having multiple UEs 115 in communication with a base station 105 via communication links 125, where the base station 105 is also connected to a network 210. The UEs 115 may be examples of the UEs described in the present disclosure that are configured to detect beam management events for reporting to one or more base stations 105. Moreover the base station 105 may be an example of the base stations described in the present disclosure (e.g., eNB, gNB, etc. providing one or more macrocells, small cells, etc.) that are configured to configure beam management event reporting at the UE(s) 115.

In an aspect, the UE 115 in FIG. 3 may include one or more processors 305 and/or memory 302 that may operate in combination with an event detecting component 340 to perform the functions, methods (e.g., method 500 of FIG. 5), etc., presented in the present disclosure. In accordance with the present disclosure, the event detecting component 340 may include a configuration receiving component 342 for receiving a beam management event configuration (e.g., from one or more base stations 105) indicating one or more parameters for detecting a beam management event, such as one or more types or identifiers of beams (e.g., reference signals, synchronization signals, or other broadcast signals/beams) to measure, parameters for measuring the beams and/or determining occurrence of events based on the beam measurements, etc., and/or a beam measuring component 344 for measuring one or more beams based on the beam management event configuration to determine occurrence of one or more beam management events.

The one or more processors 305 may include a modem 320 that uses one or more modem processors. The various functions related to the event detecting component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the event detecting component 340. In another example, event detecting component 340 may operate at one or more communication layers, such as physical layer or L1, MAC layer or L2, a PDCP/RLC layer or L3, etc., to measure reference signals and/or detect/report corresponding beam management events.

In some examples, the event detecting component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to receive signals that include the packets (e.g., and/or one or more related PDUs) received by the event detecting component 340. RF front end 390 may be connected to one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can connect with transceiver 370. The transceiver 370 may connect to one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or event detecting component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining event detecting component 340 and/or one or more of its sub-components. Additionally or alternatively, the UE 115 may include a bus 311 for coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 7. Similarly, the memory 302 may correspond to the memory described in connection with the UE in FIG. 7.

FIG. 4 illustrates a flow chart of an example of a method 400 for configuring (e.g., by a base station and/or by using a beam management event configuration) parameters for a node to detect and report beam management events.

At Block 402, a beam management event configuration indicating a type of at least one beam to measure in determining occurrence of a trigger condition for a beam management event can be generated. In an aspect, configuration generating component 242, e.g., in conjunction with processor(s) 205, memory 202, transceiver 270, and/or beam managing component 240, can generate the beam management event configuration indicating the type of the at least one beam to measure in determining occurrence of the trigger condition for the beam management event. For example, beam managing component 240 can generate the beam management event configuration to specify parameters to enable the UE 115 to detect and/or report certain beam management events, which may include measuring beams of the type indicated in the beam management event configuration. For example, the beam management event configuration can indicate a type of one or more RSs, synchronization signals, other broadcast signals/beam, etc. to measure. The beam management event configuration may also indicate an identifier for one or more signals to be measured for one or more of the indicated beam type(s).

In a specific example, the beam management event configuration can define one or more beam management events to track a change in UE 115 location/channel for the purpose of the base station 105 managing beam transmission to the UE 115, where the beam management events can be defined to be triggered based on CSI-RS or NR-SS configured by the base station 105. In one example, the beam management event configuration can specify a beam type for indicating one or more types of broadcast signals (e.g., RS such as CSI-RS, SS such as NR-SS, etc.) to measure to determine whether a beam management event occurs. For example, configuration generating component 242 may generate the configuration to indicate a beam type of single CSI-RS (e.g., along with an identifier of the specific CSI-RS to measure), single NR-SS (e.g., along with an identifier of the specific NR-SS to measure), group of CSI-RS measurements (e.g., with an identifier of the group, which can be separately mapped to associated CSI-RS identifiers within the group) along with an indication of a function such as average or maximum measurement for the group, group of NR-SS measurements (e.g., with an identifier of the group, which can be separately mapped to associated NR-SS identifiers within the group) along with an indication of a function such as average or maximum measurement for the group, group of CSI-RS and NR-SS measurements (e.g., with an identifier of the group, which can be separately mapped to associated CSI-RS and/or NR-SS identifiers within the group) along with an indication of a function such as average or maximum measurement for the group, etc.

In another example, configuration generating component 242 may generate the beam management event configuration to include additional parameters, such as an indication of measurement quantities to measure, such as reference signal received power (RSRP), including CSI-RS-RSRP, SS-RSRP, or combined group RSRP, reference signal received quality (RSRQ), including CSI-RS-RSRQ, SS-RSRQ, or combined group RSRQ, signal-to-interference-and-noise ratio (SINR), including CSI-RS-SINR, SS-SINR, or combined group SINR, etc. In another example, configuration generating component 242 may generate the beam management event configuration to include a time to trigger (e.g., for each event, corresponding beam type and/or measurement quantity for event type, etc.), where the time to trigger indicates a period of time for which the event or corresponding measurements and/or related conditions can be detected before reporting occurrence of the event. In another example, configuration generating component 242 may generate the beam management event configuration to include one or more parameters for detecting an event, such as a reference resource, as described further herein. In another example, configuration generating component 242 may generate the beam management event configuration to include a list of resources to monitor for a beam, which may include adding or removing some resources in a given configuration (e.g., as compared to a previous configuration).

In a specific example, the beam management events, which may be at least partially defined by parameters in the beam management event configuration and/or otherwise known or coded in the base station 105 and/or UE 115, may include one or more events similar to the following:

Event BM1: an event for which a measurement of a configured beam resource (e.g., RS resource) becomes better than a threshold;

Event BM2: an event for which a measurement of a configured beam resource becomes an offset better than a reference resource;

Event BM3: an event for which a measurement of a configured beam resource becomes an offset better than a first threshold and reference resource becomes worse than a second threshold;

As described, the beam management event configuration may specify a time to trigger for one or more of the events to indicate a time during which the event condition(s) remain before triggering reporting of an event to the base station 105. In addition, for example, the beam management events may be triggered based on measurement of corresponding beam resources where the measurement may correspond to one or more of a single or group NR-SS/CSI-RS measurement after L1 filtering, a single or group NR-SS/CSI-RS measurement after L3 filtering, etc.

At Block 404, the beam management event configuration can be transmitted to one or more nodes. In an aspect, beam managing component 240, e.g., in conjunction with processor(s) 205, memory 202, transceiver 270, etc., can transmit the beam management event configuration to the one or more nodes. For example, beam managing component 240 can transmit the beam management event configuration to one or more UEs 115 by broadcasting the configuration in system information (e.g., one or more master information blocks (MIB), system information blocks (SIB), or other data transmitted over a broadcast channel), a dedicated control channel, and/or the like. In one example, beam managing component 240 can transmit the configuration in a ReportConfig container of a SIB (e.g., as defined in LTE, 5G NR, etc.).

Optionally, at Block 406, one or more beamformed signals can be transmitted to the one or more nodes. In an aspect, beamforming component 244, e.g., in conjunction with processor(s) 205, memory 202, transceiver 270, beam managing component 240, etc., can transmit the one or more beamformed signals to the one or more nodes. For example, beamforming component 244 can beamform the one or more signals based on a beamforming matrix to transmit the signal(s) in a directional beam towards a region identified as associated with the UE 115. This can allow the UE 115 to detect the beam and determine whether the one or more beam management event conditions are triggered, as described further herein. In addition, as described, the beamformed signals can be NR-SSs, CSI-RSs, other SSs or RSs, other broadcast signals/beams, etc., for which a configuration to detect and utilize the beam signals can be provided to the UE 115 (e.g., by the beam managing component 240, as described further herein).

At Block 408, an indication of the trigger condition can be received from one or more nodes. In an aspect, event detecting component 246, e.g., in conjunction with processor(s) 205, memory 202, transceiver 270, beam managing component 240, etc., can receive, from the one or more nodes (e.g., one or more UEs 115), an indication of the trigger condition. For example, as described further herein, the one or more nodes may detect the trigger condition based on comparing measurements of beams to determine occurrence of the trigger condition for one or more beam management events. The UE 115 can transmit the indication to the base station 105 over a control channel, as control data or user plane data over a data channel, etc., as described further herein. In a specific example, the indication may include a L1 measurement report of measurement of a beam that caused triggering of the event. For example, where the beam corresponds to a single type of beam (e.g., CSI-RS or NR-SS), as described above, the L1 measurement may correspond to a L1 SS-RSRP/SS-RSRQ/SS-SINR depending on the configuration, or a L1 CSI-RS-RSRP/CSI-RS-RSRQ/CSI-RS-SINR depending on the configuration. Where the beam corresponds to a group of beams that may be of one or more multiple types (e.g., NR-SS and/or CSI-RS), as described above, the indication may include the group identifier, an L1 group combined quality (e.g., one value indicating a maximum or average RSRP/RSRQ/SINR depending on the configuration), a best x signal resources' index and/or quality where x can be configured by the network, and/or index or quality can also be configured. In either case, the reporting may be aperiodic, periodic, semi-persistent, etc.

At Block 410, a beam configuration for utilizing one or more transmitted beams in estimating a transmitted channel can be generated for the one or more nodes and based on receiving the indication of the trigger condition. In an aspect, configuration generating component 242, e.g., in conjunction with processor(s) 205, memory 202, transceiver 270, beam managing component 240, event detecting component 246, etc., can generate, for the one or more nodes (e.g., UE(s) 115) and based on receiving the indication of the trigger condition (e.g., from the UE(s) 115), a beam configuration for utilizing one or more transmitted beams in estimating a transmitted channel. For example, beam managing component 240 can determine a location/channel relevant to the UE 115 based on the received indication of the trigger condition. For example, as described, the indication may include measurement reports for signal(s) received at the UE 115, which may correspond to signals identified in the beam management event configuration. Beam managing component 240, in an example, can determine a location or channel for the UE 115 based on the reported measurements of the beams.

Figure 6:
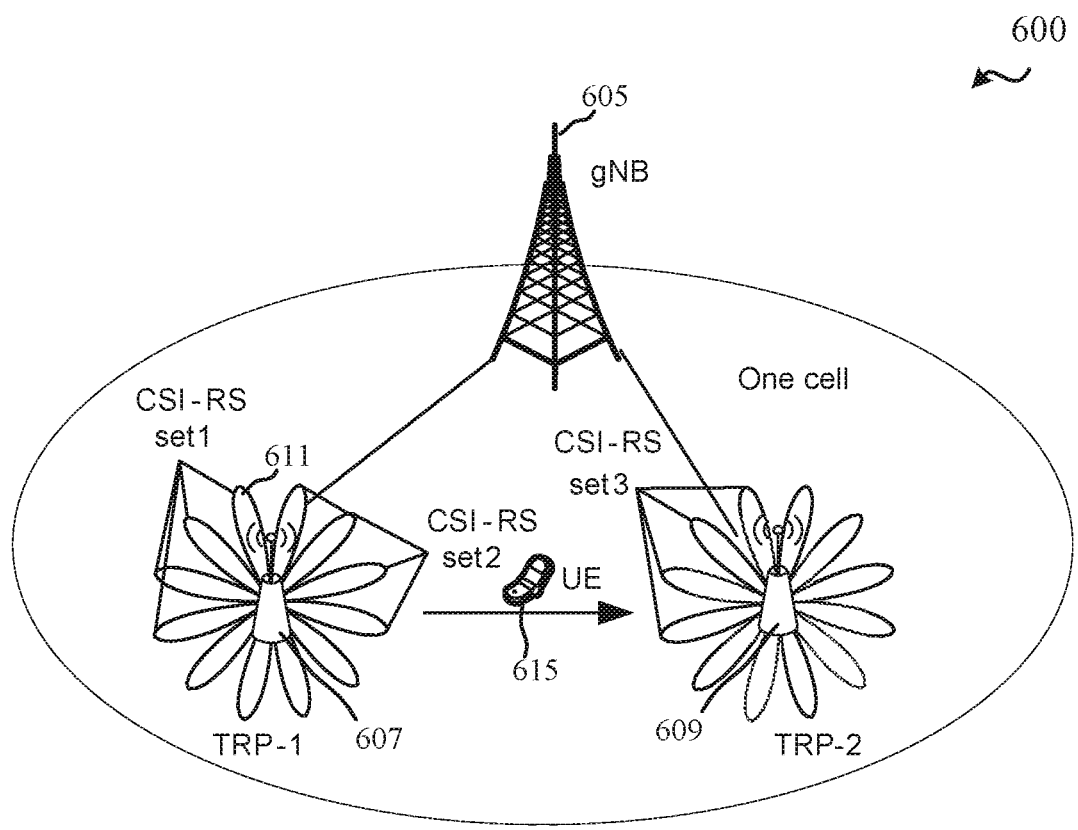
FIG. 6 is a diagram illustrating an example of a system for detecting and reporting beam management events, in accordance with various aspects of the present disclosure.

An example is depicted in FIG. 6, which illustrates an example of a wireless communication system 600 in accordance with aspects described herein. The system 600 includes a gNB 605 that can provide multiple transmission/reception points (TRxP) 607, 609. System 600 also includes a UE 615 that can communicate with the gNB 605 via one or more of the TRxPs 607, 609. The TRxPs 607, 609 can each provide multiple CSI-RS sets each including multiple CSI-RS beams transmitted in directions from the TRxPs. In the depicted example, the UE 615 can start in a location where CSI-RSs from CSI-RS set 2 of TRxP 607 are associated with the UE 615, where the association may be based on reported measurements (e.g., CSI-RS-RSRP, CSI-RS-RSRQ, CSI-RS-SINR, NR-SS-RSRP, NR-SS-RSRQ, NR-SS-SINR, etc.) from the UE 615 of the corresponding received RSs. In any case, the UE 615 can move towards TRxP2 609, and the CSI-RSs in the CSI-RS set 3 of TRxP 609 may become more desirable than those of CSI-RS set 2 of TRxP 607. The network conventionally may not be aware of the change of UE location/channel based on the existing cell specific events, and may not be able to maintain CSI-RS resource configuration for beam management effectively, as in conventional networks, the network may configure all possible CSI-RS resources for the UE and activate one CSI-RS for UE to use based on the UE's L1 reporting on all CSI-RSs.

Accordingly, as described herein, where the CSI-RS set 3 of TRxP 609 becomes more desirable than those of CSI-RS set 2 of TRxP 607 (e.g., based on corresponding measured signal strength of the CSI-RS and/or NR-SS beams), this may cause triggering of a beam management event (e.g., BM1, BM2, or BM3), as configured in a beam management event configuration. Thus, for example, UE 615 may transmit an indication of occurrence of the triggered event to the gNB 605, which may include measurement of the CSI-RSs from CSI-RS set 3 of TRxP 609. gNB 605 may accordingly generate a reference signal configuration for the UE 615 to receive CSI-RSs in the CSI-RS set 3 of TRxP 609.

In other examples, C1 and/or C2 procedures in LTE could possibly be used for beam management, but this may only work for CSI-RS, may only allow L3 measurements as the C1/C2 events in LTE are L3 events, and/or may cause significant overhead due to per-beam event (e.g., up to 64 NR-SS). Thus, defining the beam management events, as described herein, may be desirable. In addition, though CSI-RS is shown in the example of FIG. 6, additional or alternative types of beams may be used, as described herein (e.g., NR-SS, other broadcast signals/beams, etc.).

At Block 412, the beam configuration can be transmitted to the one or more nodes. In an aspect, beam managing component 240, e.g., in conjunction with processor(s) 205, memory 202, transceiver 270, etc., can transmit the beam configuration to the one or more nodes (e.g., the one or more UEs 115). For example, the beam configuration can correspond to a configuration that enables the UE(s) 115 to obtain and measure beams, such as a CSI-RS (e.g., in the CSI-RS set of a TRxP), and use the measured beam for reporting to the network and/or estimating a channel transmitted by the base station 105 and/or provide associated channel feedback. As described, in an example, the UE 115 can continually (e.g., periodically, aperiodically, semi-persistently, etc.) transmit an indication of the trigger condition to the base station 105, when detected, which can cause generation of the beam configuration as described herein.

In some examples, the Blocks in method 400 can be performed by different network nodes. For example, one node can configure the UE by performing functions in Blocks 402 and 404, and another node can transmit the beamformed signals in Block 406. Moreover a different node may receive the indication of the trigger condition in Block 408 and/or perform the functions in Blocks 410 and 412, etc.

FIG. 5 illustrates a flow chart of an example of a method 500 for reporting (e.g., by a UE) an indication of a trigger condition for a beam management event.

In method 500, at Block 502, a beam management event configuration indicating a type of at least one beam to measure in determining occurrence of a trigger condition for a beam management event can be received. In an aspect, configuration receiving component 342, e.g., in conjunction with processor(s) 305, memory 302, transceiver 370, and/or event detecting component 340, can receive the beam management event configuration indicating the type of the at least one beam to measure in determining occurrence of the trigger condition for the beam management event. As described, the beam management event configuration may include various parameters defining one or more beam events (e.g., BM1, BM2, BM3) that can be detected and reported by the UE 115, such as an indication of a type and/or identifier of a beam or group of beams to measure, an indication of measurement values to compare, a reference resource for BM2, a time to trigger, etc. The UE 115 can obtain the parameters from the configuration for detecting the corresponding triggers of the events. In addition, for example, configuration receiving component 342) can obtain the beam management configuration from the base station 105 (e.g., via system information such as MIB, SIB, etc., via dedicated control channel, via other signaling), from memory 302, and/or the like. Moreover, as described, the beams defined in the configuration may include one or more reference signals (e.g., CSI-RS), synchronization signals (e.g., NR-SS), other broadcast signals/beams, and/or the like.

At Block 504, a parameter of a signal received from one or more nodes can be measured, where the signal corresponds to the type of the at least one beam. In an aspect, beam measuring component 344, e.g., in conjunction with processor(s) 305, memory 302, transceiver 370, and/or event detecting component 340, etc. can measure the parameter of the signal received from the one or more nodes (e.g., base station(s) 105, corresponding TRxPs, etc.) where the signal corresponds to the type of the at least one beam. As described, for example, the beam management event configuration may indicate the type of beam, and the beam measuring component 344 can accordingly measure the type of beam (e.g., based on determining resources corresponding to the type of beam, detecting the type of beam based on information in the beam, etc.). In addition, in an example, the beam measuring component 344 can measure beam(s) corresponding to an identifier indicated in the beam management event configuration, which may include measuring single signals indicated by identifier, multiple signals indicated by identifier, different types of signals (e.g., CSI-RS, NR-SS, etc.), and/or the like. In another example, beam measuring component 344 can measure beams corresponding to a group identifier indicated in the beam management event configuration, where a mapping between the group identifier and one or more identifiers of beams (e.g., CSI-RS and/or NR-SS) is configured at the UE 115.

At Block 506, the occurrence of the trigger condition for the beam management event can be determined based on the parameter of the signal. In an aspect, event detecting component 340, e.g., in conjunction with processor(s) 305, memory 302, transceiver 370, etc. can determine, based on the parameter of the signal, the occurrence of the trigger condition for the beam management event. For example, the event detecting component 340 can determine that the parameter of the signal, compared with one or more other values, causes occurrence of the trigger condition corresponding to one or more events defined in the beam management event configuration. For example, event detecting component 340 can determine the occurrence of the trigger condition based on comparing the parameter of the signal (e.g., CSI-RS-RSRP, CSI-RS-RSRQ, CSI-RS-SINR, NR-SS-RSRP, NR-SS-RSRQ, NR-SS-SINR, etc.) to a threshold (for BM1 event), to a reference resource (e.g., to determine whether an offset achieves a threshold for BM2 event), and/or both (e.g., in BM3 event). Moreover, for example, event detecting component 340 can determine the occurrence of the trigger condition for a period of time corresponding to a time to trigger for the event (which may also be specified in the beam management event configuration) to determine whether to report occurrence of the event and/or the corresponding trigger condition.

At Block 508, an indication of the occurrence of the trigger condition can be reported to the one or more nodes or a different node. In an aspect, event detecting component 340, e.g., in conjunction with processor(s) 305, memory 302, transceiver 370, etc. can report, to the one or more nodes or a different node (e.g., base station 105 and/or other base station(s)), an indication of the occurrence of the trigger condition. For example, event detecting component 340 can report the occurrence of the trigger condition including one or more measurements that caused the trigger condition (e.g., CSI-RS-RSRP, CSI-RS-RSRQ, CSI-RS-SINR, NR-SS-RSRP, NR-SS-RSRQ, NR-SS-SINR, etc. of a configured CSI-RS, NR-SS, and/or group of signals). For example, event detecting component 340 can configured the report to include the NR-SS or CSI-RS identifier and an L1 measurement, a group identifier and an L1 combined measurement and/or best x signal resource's index or quality, etc., as described above. In addition, event detecting component 340 can provide the report aperiodically, periodically, semi-persistently, etc., over an uplink data channel (e.g., physical uplink shared channel (PUSCH)) based on L3 filtering, over a control channel (e.g., physical uplink control channel (PUCCH), such as long or short PUCCH in NR based on L1 filtering, over uplink control information (UCI) on PUSCH with short latency (e.g., one-symbol, two-symbol, or slot transmission time interval (TTI), etc.), and/or the like.

Optionally, at Block 510, a beam configuration for utilizing received beams in communicating with the one or more nodes or a different node can be received based on reporting the indication. In an aspect, configuration receiving component 342, e.g., in conjunction with processor(s) 305, memory 302, transceiver 370, event detecting component 340, etc. can receive, based on reporting the indication, the beam configuration for utilizing received beams in communicating with the one or more nodes or a different node. In an example, the base station 105 can reconfigure a beam configuration for the UE 115 based on the reported trigger condition or corresponding beam management event, which may indicate a change in location of the UE 115 closer to a different CSI-RS set (or other beam set), as described above. Thus, the beam configuration received from the base station 105 may configure a different CSI-RS set (or other beam set) of the UE 115 to utilize in estimating a channel, determining channel feedback, etc. In one example, the beam configuration can correspond to CSI-RS configuration, though the beam management configuration may correspond to measuring NR-SS, CSI-RS, or both to detect the beam management events.

In one example, the base station 105 may configure beam management event configuration to indicate parameters to measure NR-SS (and not CSI-RS or other RS) in detecting the beam management events to reduce overhead. In this example, the configuration generating component 242 may generate the configuration for the UE 115 to indicate a single or group of NR-SS and/or an association (e.g., quasi co-location (QCL)) between the NR-SS and CSI-RS. Thus, where the event detecting component 246 detects the triggered beam management event based on NR-SS, configuration generating component 242 can generate a configuration/reconfiguration of CSI-RS corresponding to the association (e.g., QCL) between the NR-SS and CSI-RS.

Figure 7:
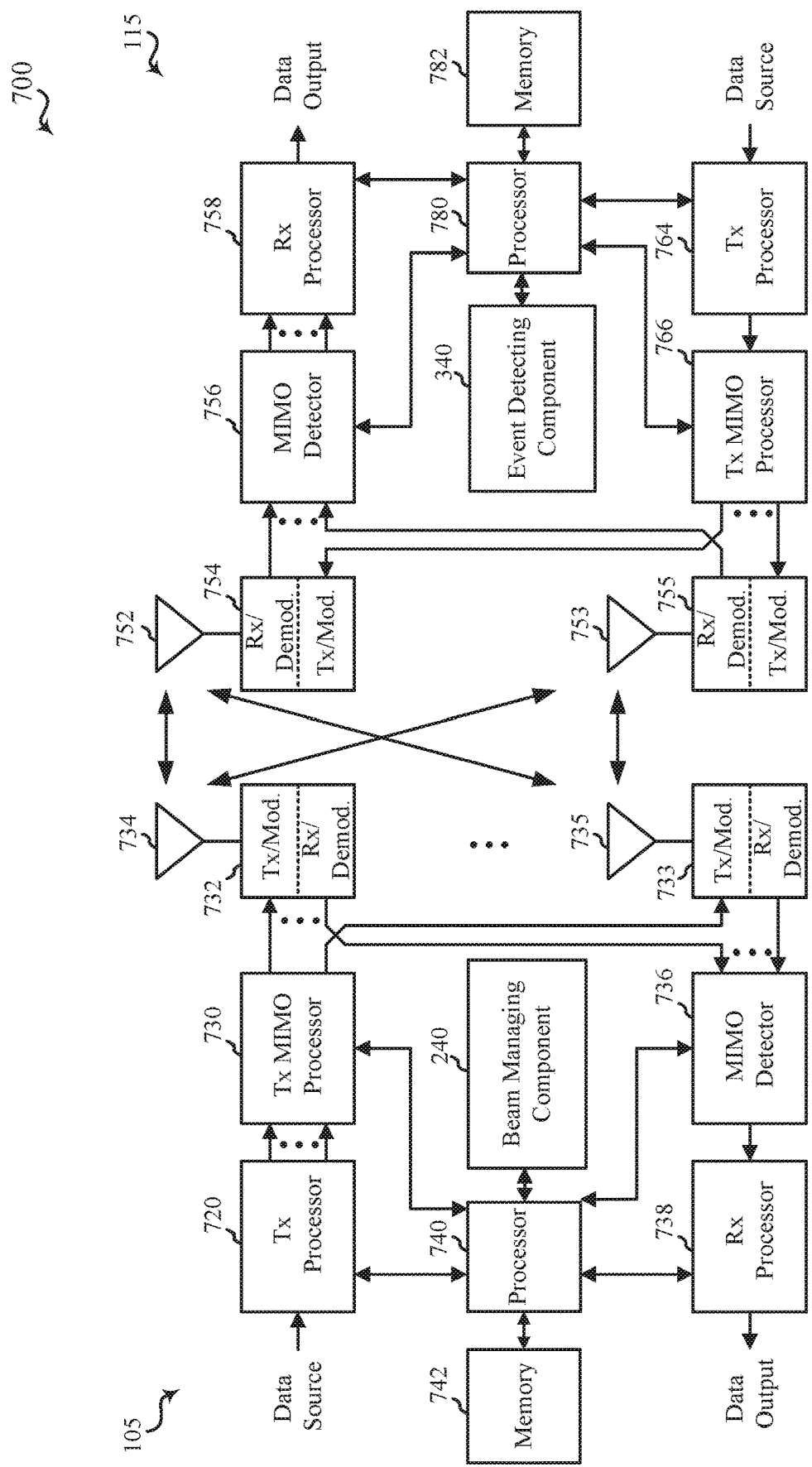
FIG. 7 is a block diagram illustrating an example of a MIMO communication system including a base station and a UE, in accordance with various aspects of the present disclosure.

FIG. 7 is a block diagram of a MIMO communication system 700 including a base station 105 and a UE 115. The MIMO communication system 700 may illustrate aspects of the wireless communication system 100 described with reference to FIG. 1. The base station 105 may be an example of aspects of the base station 105 described with reference to FIGS. 1-3. The base station 105 may be equipped with antennas 734 and 735, and the UE 115 may be equipped with antennas 752 and 753. In the MIMO communication system 700, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 115 may be an example of aspects of the UEs 115 described with reference to FIGS. 1-3. At the UE 115, the UE antennas 752 and 753 may receive the DL signals from the base station 105 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 115 to a data output, and provide decoded control information to a processor 780, or memory 782.

The processor 780 may in some cases execute stored instructions to instantiate an event detecting component 340 (see e.g., FIGS. 1 and 3).

On the uplink (UL), at the UE 115, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 105 in accordance with the communication parameters received from the base station 105. At the base station 105, the UL signals from the UE 115 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a beam managing component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 700.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD- ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for managing beams in wireless communications, comprising:
   receiving, by a user equipment (UE), a beam management event configuration indicating an identifier for identifying at least one beam to be received from one or more nodes, wherein the beam management event configuration includes a configuration parameter that indicates a type of the at least one beam, wherein the configuration parameter indicates the type as being either a channel state information reference signal (CSI-RS) or a new radio synchronization signal (NR-SS);
   measuring, based on the type of the at least one beam indicated by the configuration parameter, a parameter of a signal received from the one or more nodes to detect occurrence of a trigger condition for a beam management event, wherein the signal corresponds to the type of the at least one beam; and
   reporting, to the one or more nodes or a different node, an indication of the occurrence of the trigger condition.

2. The method of claim 1, further comprising receiving, based on reporting the indication of the occurrence of the trigger condition, a beam configuration for utilizing a different set of received beams for measuring to detect the beam management event.

3. The method of claim 1, wherein reporting the indication of the occurrence of the trigger condition occurs in a media access control (MAC) layer.

4. The method of claim 1, wherein reporting the indication of the occurrence of the trigger condition occurs in a radio resource control (RRC) layer.

5. The method of claim 1, wherein the beam management event configuration indicates the type as the CSI-RS, and wherein measuring the parameter of the signal includes measuring the parameter of the CSI-RS to detect occurrence of the trigger condition.

6. The method of claim 1, wherein the beam management event configuration indicates the type as the NR-SS, and wherein measuring the parameter of the signal includes measuring the parameter of the NR-SS to detect occurrence of the trigger condition.

7. The method of claim 6, further comprising receiving, based on reporting the indication of the occurrence of the trigger condition, a beam configuration for utilizing received beams in communicating with the one or more nodes or the different node, wherein the received beams correspond to CSI-RSs.

8. The method of claim 1, wherein:
   where the beam management event configuration indicates the type as the CSI-RS, the beam management event configuration indicates the identifier of the at least one beam as a CSI-RS identifier; and
   where the beam management event configuration indicates the type as the NR-SS, the beam management event configuration indicates the identifier of the at least one beam as a NR-SS identifier.

9. The method of claim 1, wherein the beam management event configuration indicates the type as a group of beams comprising two or more CSI-RSs and/or NR-SSs, wherein the identifier identifies the group of beams, and further comprising determining identifiers of the two or more CSI-RSs and/or NR-SSs, wherein measuring the parameter of the signal comprises measuring parameters of multiple beams corresponding to the identifiers of the two or more CSI-RSs and/or NR-SSs.

10. The method of claim 9, wherein measuring the parameter of the beam comprises determining an average or maximum of the parameters of the multiple beams.

11. The method of claim 1 wherein the at least one beam is from a node of the one or more nodes to the UE, and wherein the beam management event results in reconfiguration of the at least one beam from the node to the UE.

12. The method of claim 1, wherein the beam management event configuration indicates a type of the parameter corresponding to at least one of a reference signal received power (RSRP), a reference signal received quality (RSRQ), or a signal-to-interference-and-noise ratio (SINR).

13. The method of claim 12, wherein measuring the parameter of the signal is performed based on a physical layer filtering technique.

14. The method of claim 12, wherein measuring the parameter of the signal is performed based on a radio resource control layer filtering technique.

15. The method of claim 1, wherein the beam management event configuration indicates, for the trigger condition, a time during which the trigger condition occurs before reporting the indication.

16. The method of claim 1, wherein reporting the indication is based at least in part on comparing the parameter to a threshold.

17. The method of claim 1, wherein reporting the indication is based at least in part on comparing an offset between the parameter and a similar parameter of a different signal, to be used as a reference, to determine whether the offset achieves a threshold, wherein the beam management event configuration indicates the different signal.

18. The method of claim 1, wherein reporting the indication is based at least in part on:

comparing the parameter to a threshold; and
comparing an offset between the parameter and a similar parameter of a different signal, to be used as a reference, to determine whether the offset achieves a second threshold.

19. The method of claim 1, wherein reporting the indication comprises transmitting the indication as uplink control information or uplink data over a shared data channel.

20. The method of claim 1, wherein reporting the indication comprises transmitting the indication as uplink control information over an uplink control channel.

21. A method for managing beams in wireless communications, comprising:
generating a beam management event configuration indicating an identifier for identifying at least one beam to be transmitted to one or more nodes, wherein the beam management event configuration includes a configuration parameter that indicates a type of the at least one beam, wherein the configuration parameter indicates the type as being either a channel state information reference signal (CSI-RS) or a new radio synchronization signal (NR-SS);
transmitting the beam management event configuration to the one or more nodes;
receiving, from the one or more nodes, an indication of a trigger condition;
generating, for the one or more nodes and based on receiving the indication of the trigger condition, a beam configuration for utilizing one or more transmitted beams in estimating a transmitted channel; and
transmitting the beam configuration to the one or more nodes.

22. The method of claim 21, wherein the beam management event configuration indicates the type as the CSI-RS.

23. The method of claim 21, wherein the beam management event configuration indicates the type as the NR-SS.

24. The method of claim 23, wherein the beam configuration corresponds to CSI-RSs.

25. The method of claim 21, wherein:
where the beam management event configuration indicates the type as the CSI-RS, the beam management event configuration indicates the identifier of the at least one beam as a CSI-RS identifier, and
where the beam management event configuration indicates the type as the NR-SS, the beam management event configuration indicates the identifier of the at least one beam as a NR-SS identifier.

26. The method of claim 21, wherein the beam management event configuration indicates the type as a group of beams comprising two or more CSI-RSs and/or NR-SSs, and wherein the identifier identifies the group of beams.

27. The method of claim 21, wherein the beam management event configuration indicates a type of a parameter corresponding to at least one of a reference signal received power (RSRP), a reference signal received quality (RSRQ), or a signal-to-interference-and-noise ratio (SINR).

28. The method of claim 21, wherein the beam management event configuration indicates, for the trigger condition, a time during which the trigger condition occurs before the one or more nodes are to report the indication.

29. The method of claim 21, wherein receiving the indication comprises receiving the indication in uplink control information or uplink data over a shared data channel.

30. The method of claim 21, wherein receiving the indication comprises receiving the indication as uplink control information over an uplink control channel.

31. An apparatus for managing beams in wireless communications, comprising:
a transceiver for communicating one or more wireless signals via one or more antennas;
a memory configured to store instructions; and
one or more processors communicatively coupled with the transceiver and the memory, wherein the one or more processors are configured to:
receive a beam management event configuration indicating an identifier for identifying at least one beam to be received from one or more nodes, wherein the beam management event configuration includes a configuration parameter that indicates a type of the at least one beam, wherein the configuration parameter indicates the type as being either a channel state information reference signal (CSI-RS) or a new radio synchronization signal (NR-SS);
measure, based on the type of the at least one beam indicated by the configuration parameter, a parameter of a signal received from the one or more nodes to detect occurrence of a trigger condition for a beam management event, wherein the signal corresponds to the type of the at least one beam; and
report, to the one or more nodes or a different node, an indication of the occurrence of the trigger condition.

32. The apparatus of claim 31, wherein the one or more processors are further configured to receive, based on reporting the indication of the occurrence of the trigger condition, a beam configuration for utilizing a different set of received beams for measuring to detect the beam management event.

33. The apparatus of claim 31, wherein the beam management event configuration indicates the type as the CSI-RS, and wherein the one or more processors are configured to measure the parameter of the CSI-RS to detect occurrence of the trigger condition.

34. The apparatus of claim 31, wherein the beam management event configuration indicates the type as the NR-SS, and wherein the one or more processors are configured to measure the parameter of the NR-SS to detect occurrence of the trigger condition.

35. The apparatus of claim 31, wherein:
where the beam management event configuration indicates the type as the CSI-RS, the beam management event configuration indicates the identifier of the at least one beam as a CSI-RS identifier, and
where the beam management event configuration indicates the type as the NR-SS, the beam management event configuration indicates the identifier of the at least one beam as a NR-SS identifier.

36. An apparatus for managing beams in wireless communications, comprising:
a transceiver for communicating one or more wireless signals via one or more antennas;
a memory configured to store instructions; and
one or more processors communicatively coupled with the transceiver and the memory, wherein the one or more processors are configured to:
generate a beam management event configuration indicating an identifier for identifying at least one beam to be transmitted to one or more nodes, wherein the beam management event configuration includes a configuration parameter that indicates a type of the at least one beam, wherein the configuration parameter indicates the type as being either a channel state information reference signal (CSI-RS) or a new radio synchronization signal (NR-SS);

transmit the beam management event configuration to the one or more nodes;
receive, from the one or more nodes, an indication of a trigger condition;
generate, for the one or more nodes and based on receiving the indication of the trigger condition, a beam configuration for utilizing one or more transmitted beams in estimating a transmitted channel; and
transmit the beam configuration to the one or more nodes.

37. The apparatus of claim 36, wherein:
where the beam management event configuration indicates the type as the CSI-RS, the beam management event configuration indicates the identifier of the at least one beam as a CSI-RS identifier, and
where the beam management event configuration indicates the type as the NR-SS, the beam management event configuration indicates the identifier of the at least one beam as a NR-SS identifier.

38. The apparatus of claim 36, wherein the beam management event configuration indicates the type as the CSI-RS.

39. The apparatus of claim 36, wherein the beam management event configuration indicates the type as the NR-SS.

40. An apparatus for managing beams in wireless communications, comprising:
means for receiving a beam management event configuration indicating an identifier for identifying at least one beam to be received from one or more nodes, wherein the beam management event configuration includes a configuration parameter that indicates a type of the at least one beam, wherein the configuration parameter indicates the type as being either a channel state information reference signal (CSI-RS) or a new radio synchronization signal (NR-SS);
means for measuring, based on the type of the at least one beam indicated by the configuration parameter, a parameter of a signal received from the one or more nodes to detect occurrence of a trigger condition for a beam management event, wherein the signal corresponds to the type of the at least one beam; and
means for reporting, to the one or more nodes or a different node, an indication of the occurrence of the trigger condition.

41. The apparatus of claim 40, further comprising means for receiving, based on reporting the indication of the occurrence of the trigger condition, a beam configuration for utilizing a different set of received beams for measuring to detect the beam management event.

42. An apparatus for managing beams in wireless communications, comprising:
means for generating a beam management event configuration indicating an identifier for identifying at least one beam to be transmitted to one or more nodes, wherein the beam management event configuration includes a configuration parameter that indicates a type of the at least one beam, wherein the configuration parameter indicates the type as being either a channel state information reference signal (CSI-RS) or a new radio synchronization signal (NR-SS);
means for transmitting the beam management event configuration to the one or more nodes;
means for receiving, from the one or more nodes, an indication of a trigger condition;
means for generating, for the one or more nodes and based on receiving the indication of the trigger condition, a beam configuration for utilizing one or more transmitted beams in estimating a transmitted channel; and
means for transmitting the beam configuration to the one or more nodes.

43. The apparatus of claim 42, wherein the beam management event configuration indicates the type as the CSI-RS and an identifier of the CSI-RS to measure, or as the NR-SS and an identifier of the NR-SS to measure.

44. A non-transitory computer-readable storage medium, comprising computer-executable code for managing beams in wireless communications, the code comprising code for:
receiving, by a user equipment (UE), a beam management event configuration indicating an identifier for identifying at least one beam to be received from one or more nodes, wherein the beam management event configuration includes a configuration parameter that indicates a type of the at least one beam, wherein the configuration parameter indicates the type as being either a channel state information reference signal (CSI-RS) or a new radio synchronization signal (NR-SS);
measuring, based on the type of the at least one beam indicated by the configuration parameter, a parameter of a signal received from the one or more nodes to detect occurrence of a trigger condition for a beam management event, wherein the signal corresponds to the type of the at least one beam; and
reporting, to the one or more nodes or a different node, an indication of the occurrence of the trigger condition.

45. The non-transitory computer-readable storage medium of claim 44, the code further comprising code for receiving, based on reporting the indication of the occurrence of the trigger condition, a beam configuration for utilizing a different set of received beams for measuring to detect the beam management event.

46. A non-transitory computer-readable storage medium, comprising computer-executable code for managing beams in wireless communications, the code comprising code for:
generating a beam management event configuration indicating an identifier for identifying at least one beam to be transmitted to one or more nodes, wherein the beam management event configuration includes a configuration parameter that indicates a type of the at least one beam, wherein the configuration parameter indicates the type as being either a channel state information reference signal (CSI-RS) or a new radio synchronization signal (NR-SS);
transmitting the beam management event configuration to the one or more nodes;
receiving, from the one or more nodes, an indication of a trigger condition;
generating, for the one or more nodes and based on receiving the indication of the trigger condition, a beam configuration for utilizing one or more transmitted beams in estimating a transmitted channel; and
transmitting the beam configuration to the one or more nodes.

47. The non-transitory computer-readable storage medium of claim 46, wherein the beam management event configuration indicates the type as the CSI-RS and an identifier of the CSI-RS to measure, or as the NR-SS and an identifier of the NR-SS to measure.

* * * * *